Dec. 24, 1929.  W. MIDGLEY  1,740,995
STREET CAR CONSTRUCTION
Filed May 16, 1928
Fig. 1.
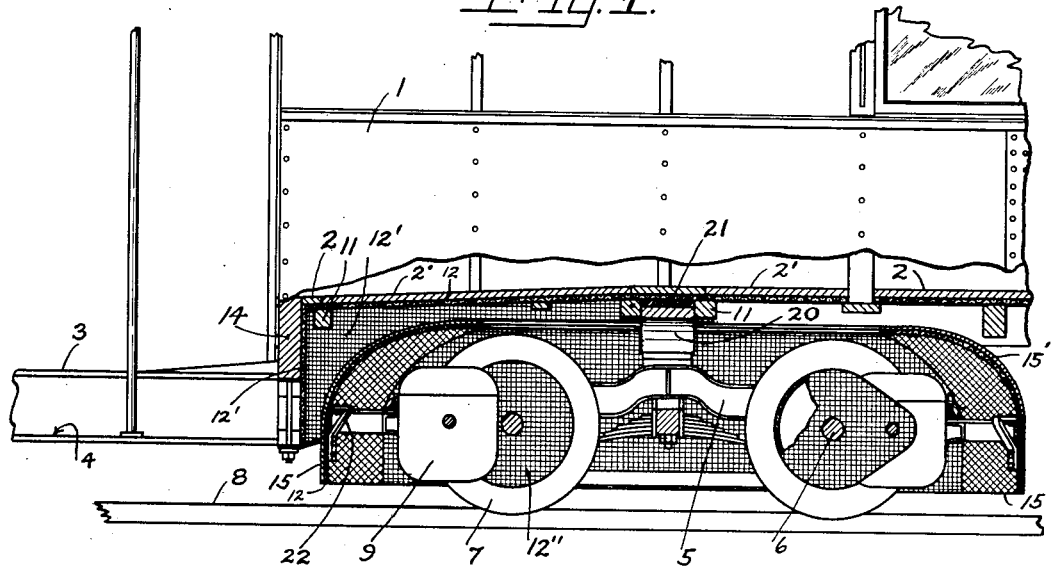
Fig. 2.
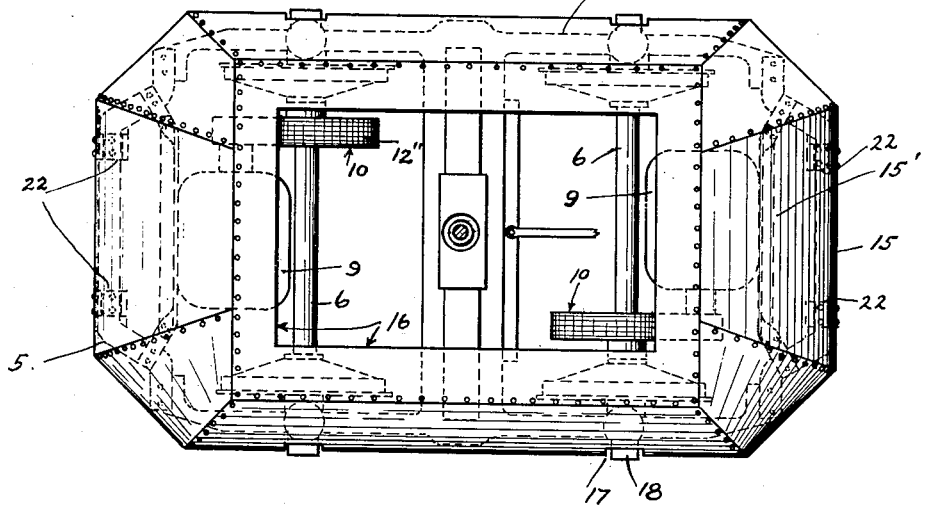
Fig. 3.  Fig. 4.
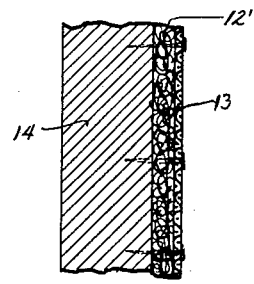  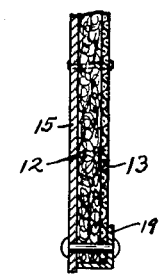
INVENTOR.
William Midgley.
BY
Miller & Boyken.
ATTORNEYS.

Patented Dec. 24, 1929

1,740,995

UNITED STATES PATENT OFFICE

WILLIAM MIDGLEY, OF SAN FRANCISCO, CALIFORNIA

STREET-CAR CONSTRUCTION

Application filed May 16, 1928. Serial No. 278,195.

This invention relates to street cars and has for its objects special underneath construction whereby the great noise usually made by street cars is much reduced.

I have discovered that most of the objectionable street car noises are generated under the car body both by the pounding of the wheels on the track joints as well as by the grinding of the motor gearing and are transmitted through the car body as a vibrating diaphragm to the surrounding air, and that these noises may be trapped close to their point of production in a manner to prevent transmission to the car body and/or to the surrounding air.

Briefly described my invention comprises applying a downwardly directed sheet metal canopy over each car truck, lining the canopy with sound absorbing material such as felt, and also applying a layer of such material to the lower side and inner ends of the car body over the trucks and above the canopy aforesaid. Other features of the invention will appear in the following specification.

In the drawing accompanying this application Fig. 1 is a broken elevation of a portion of a street car showing in section one truck and my invention applied thereto.

Fig. 2 is a detached plan view of the canopy and truck.

Fig. 3 is an enlarged section showing the means of securing the felt to the car, and Fig. 4 is a similar section showing the securing of the felt to the canopy.

In considering the drawings it should be understood that it shows the principal parts only of the car and truck as many details ordinarily found in street car construction have been eliminated so as to keep the drawings free of confusion.

In the drawings 1 is the body of the car, 2 the floor, 3 the platform, 4 the step, 5 the truck frame, 6 the wheel axles, 7 the wheels, 8 the track, 9 the driving motors carried on the truck, 10 the gear reduction boxes housing the train of gearing from motors to axles.

Above the trucks the car floor is usually provided with several loose sections or trap doors as at 2' which may be lifted out of place or opened from inside the car so as to make the motors and other mechanism accessible for inspection or repairs.

To the underside of these trap doors and underside of the car floor and above the supporting joists 11 I apply a heavy layer of soft material 12 adapted to absorb sound waves, such for instance as soft felt about a half inch in thickness.

This felt may be cemented, screwed or nailed in place, and if the latter it is preferably covered on the exposed side with a layer of fine wire screen 13, as best shown in the enlarged section Fig. 3, to better hold it in place.

The felt covering 12 is also brought down over the inner ends or transverse beams 14 of the car and also down the inner sides of the side frame members of the car as at 12'.

The gear reduction boxes 10 are also entirely covered with the felt as indicated at 12'', proper provision being made so that the boxes can be opened if necessary.

Surrounding the whole truck is a canopy 15 preferably made of heavy sheet iron and secured in place by bolting to brackets 22 in turn secured to the truck frame 5 or end continuations thereof which entirely surround the wheels in modern street car constuction.

This canopy is preferably of the general oblong form shown in Fig. 2 and is provided with curved walls at 15' so that most of its felt-lined surface lies at a right angle to the propagated sound waves engendered by the truck.

An opening 16 is left in the upper part of the canopy so that the truck mechanism will be accessible from above upon opening the trap doors 2', but it is of course desirable that this opening be no larger than necessary for the purpose intended and which will all depend on the particular type of car truck and kind of attention which it may require.

Openings are also provided in the sides of the canopy at 17 for opening of the car journal boxes 18 for lubrication in the usual way.

The inner surface of the canopy 15 is covered all over with the felt and wire screen as described, and preferably cemented and/or riveted in place.

The lower edge of the felt lining of the canopy is preferably reinforced by means of a metal strip 19 riveted in place as indicated in Fig. 4 so that the canopy forms a permanent felt-lined structure which may be applied to or removed from a car truck bodily and handled without injury to the lining.

In addition to the above features of the invention I find it of advantage to place a pad of resilient material between the truck and the car body, so that vibrations will not be so readily transmitted. In the drawings Fig. 1 the bolster secured to the body and on which the truck pivots is shown at 20, and between the bolster and body is interposed a heavy block of felt, cork or rubber, as at 21.

In considering my invention as above set forth I wish it understood that in my use of the word "felt" both in the specification and claims is to embrace any soft, fibrous or cellular material adapted to absorb sound waves in a construction of the kind shown, and which includes such cellular wood products known under the trade names Masonite and Celotex.

Trial street cars in San Francisco, California, equipped with my invention as above described have shown a reduction of noise well nigh unbelievable and have proven the invention to be practical and not to interfere with maintenance or become dislodged in use, and while the use of felt and other cellular material as a sound deadener is old, nevertheless the intolerable noise of grinding and pounding street cars in a busy city is still older and before my study of the subject and specific application no material progress in mitigating this noise nuisance has ever been made though desired by all.

I claim:

1. In a street car, a lining of sound-absorbing material positioned under the car and over the trucks, and a canopy of sound-absorbing material surrounding and carried by the trucks, said canopy comprising a metal shell open at the bottom and lined on its inner surface with sound-absorbing material.

2. In a street car, a lining of sound-absorbing material positioned under the car and over the trucks, and a canopy of sound-absorbing material surrounding and carried by the trucks, said canopy comprising a metal shell open at the bottom also provided with a work opening at the top accessible through the car floor doors and the canopy lined on its inner surface with sound-absorbing material.

3. In a street car, a canopy of sound-absorbing material, surrounding and carried by the trucks and provided with openings aligned with and through which the truck journal boxes are exposed and accessible.

4. In a street car, a sheet metal canopy surrounding each truck and open at the bottom, said canopy secured to the truck frame, and a lining of sound-absorbing material secured to the inside of the canopy.

5. In a street car, a sheet metal canopy surrounding each truck and open at the bottom, said canopy secured to the truck frame, and a lining of sound-absorbing material secured to the inside of the canopy, the lining of said canopy comprising a layer of felt protected by a foraminous sheet all riveted to the canopy body.

6. In a structure as specified in claim 4 said canopy provided with curved walls in the general form of a downwardly directed open bell.

7. In a structure as specified in claim 4 said canopy provided with curved walls in the general form of a downwardly directed open bell and with its sides extending downwardly outside of the truck wheels.

8. In a structure as specified in claim 4 said canopy provided with curved walls in the general form of a downwardly directed open bell and with its sides extending downwardly outside of the truck wheels and the side walls of the canopy provided with openings exposing the truck journal boxes for accessibility of same.

9. In a street car, a lining of sound-absorbing felt positioned under the car and over the trucks, and a layer of metal screen against the exposed surface of the felt all held in place by suitable securing means.

10. In a street car, exposed soft surfaced sound-absorbing walls extending adjacent the top, both sides, and both ends of each car truck.

WILLIAM MIDGLEY.